United States Patent [19]

Haneda

[11] Patent Number: 4,796,008
[45] Date of Patent: Jan. 3, 1989

[54] MODE SETTING DEVICE IN POCKET OR PORTABLE COMPUTERS WITH DATA TERMINAL FUNCTION

[75] Inventor: Isamu Haneda, Nara, Japan

[73] Assignee: Sharp Kabushiki Kaisha, Osaka, Japan

[21] Appl. No.: 912,695

[22] Filed: Sep. 29, 1986

Related U.S. Application Data

[63] Continuation of Ser. No. 535,821, Sep. 26, 1983, abandoned.

[30] Foreign Application Priority Data

Sep. 30, 1982 [JP] Japan ................. 57-172792

[51] Int. Cl.⁴ .................. G06F 3/02; G09G 3/02
[52] U.S. Cl. ................. 340/711; 340/712; 341/23
[58] Field of Search .......... 340/365 VL, 365 R, 706, 340/712, 711; 364/709

[56] References Cited

U.S. PATENT DOCUMENTS 4,431,988 2/1984 Molusis et al. ............... 340/365 VL

OTHER PUBLICATIONS

Publication from *Electronik*, 10/21st May 1982, pp. 51–56, Dipl.–Ing Tonio Fruhauf.

*Primary Examiner*—John W. Caldwell, Sr.
*Assistant Examiner*—Tyrone Queen
*Attorney, Agent, or Firm*—Birch, Stewart, Kolasch & Birch

[57] ABSTRACT

A data terminal interface device for use with personal computers having small or limited display capacities. A plurality of specific node setting capabilities of the computer. Designated keys are associated with the display to enable the operator to easily step through one general format or another.

1 Claim, 8 Drawing Sheets (j) | WORD    LENGTH = 8(Y/N) _
(k) | WORD    LENGTH = 8(Y/N) N 7 _
(l) | PARITY = N  (Y/N) _
(m) | PARITY = N  (Y/N) N   E _
(n) | STOP   BITS = 2 (Y/N) _
(o) | STOP   BITS = 2 (Y/N) N  1 _
(p) | Operate :           RUN
         Nrm    Aut    Quit
(q) | Operate :           PRO
         Nrm    Aut    Quit
(r) | Operate :           RESERVE
         Nrm    Aut    Quit
(s) | XON/XOFF  ON  (Y/N) _
(t) | XON/XOFF  OFF (Y/N) _
(u) | ECHO  ON  (Y/N) _
(v) | ECHO  OFF (Y/N) _
(w) | SETTING  ERROR

FIG.6(b)

MODE SETTING DEVICE IN POCKET OR PORTABLE COMPUTERS WITH DATA TERMINAL FUNCTION

This application is a continuation of application Ser. No. 535,821 filed on Sept. 26, 1983, now abandoned.

BACKGROND OF THE INVENTION

The present invention relates to means for setting a variety of modes for pocket or portable computers that can be used as a portable data terminal displaying only one or several rows of data.

Conventionally, CRT data terminals allow a variety of modes to be entered either by a DIP switching means or by operating keys so that any desired mode select guide can be displayed on the CRT screen.

If DIP switching is employed, a selected mode will remain unchanged until a change is applied. However, the DIP switch location does not indicate in which direction the switch should be pressed to change modes. In addition, if the number of the available modes increases, the number of switch elements to deal with the increased modes should also be increased, thereby causing great inconveniences.

On the other hand, if the selected modes are displayed via a data terminal that has either one or several rows of display positions, then the display contents will be limited due to insufficient display capacity.

SUMMARY OF THE INVENTION

The present invention provides means that can effectively compensate for the inadequate function described above. It provides a mode setting device that can sequentially designate any desired mode by using the combined guide display and keys that correspond to displays in position when any desired mode is being set on either a data terminal or a pocket computer where such terminal can only display data in one row or several row display positions. More particularly, when using any of the pocket or portable computers that can serve as a portable data terminal with a plurality of modes being available, the present invention provides very effective means for setting specific modes. A specific mode can be set or a detailed mode can be entered by displaying guides for the selected mode and activating keys that are independent of typewriting keys. These activating keys may be either the software keys and/or function keys which are provided just below the displays, individually matching the guided contents. The present invention provides an extremely effective means for setting modes into a pocket or portable computer that can serve as a portable data terminal having either one or several rows of the display positions. Available modes can be divided into groups consituting 2 or 3 steps. A designated group will be selected during the first mode setting operation, while the next mode will be set during the next step.

Since any desired mode can be entered by operating any key corresponding to the mode in display (where such a key is provided independent of the typewriting keys such as the software keys and/or functional keys), display contents and keys individually match each other, thus providing a visual convenience for correct recognition. Any desired mode can be entered during the third step by the operator who acts as a dialogist. Such means will enable any operator to easily operate a pocket computer without correctly remembering the mode setting procedure or even without being aided by the operation manual. Any mode entered by the process described above will remain unaffected in memory even though the terminal power source is turned off, and so such a mode can be constantly used until any change has to be made.

BRIEF DESCRIPTION OF THE DRAWINGS

FIG. 6 shows a typical example of the display, which will be made available for reference in the following detailed description of the present invention, and FIGS. 7 through 12 respectively show the flowcharts describing procedures for executing operations embodied by the present invention.

DETAILED DESCRIPTION OF THE INVENTION

Figure 1:
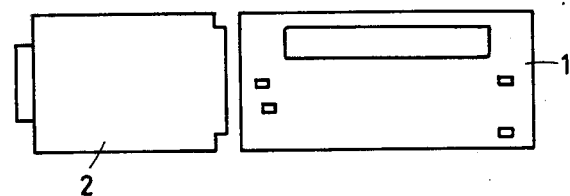
FIG. 1 is a plane view representing a preferred embodiment of the present invention.

FIG. 1 shows a preferred embodiment of the present invention, in which a data transmission interface 2 is connected to a pocket computer 1. In addition to this, both the data transmission interface 2 and pocket computer 1 can be combined as an integrated unit.

Figure 2:
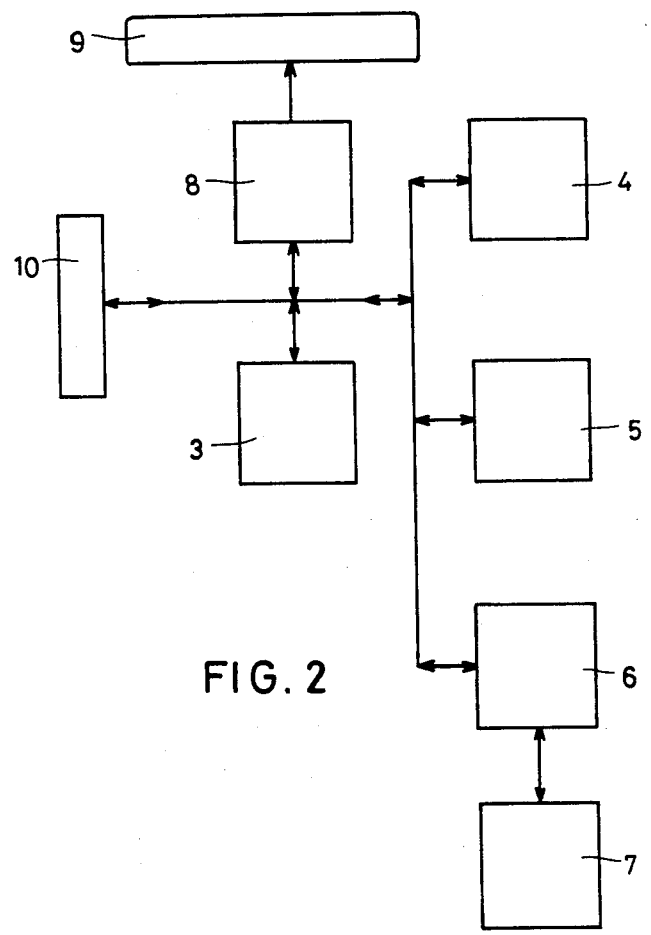
FIG. 2 is a simplified block diagram of the pocket computer 1 shown in FIG. 1.
Figure 3:
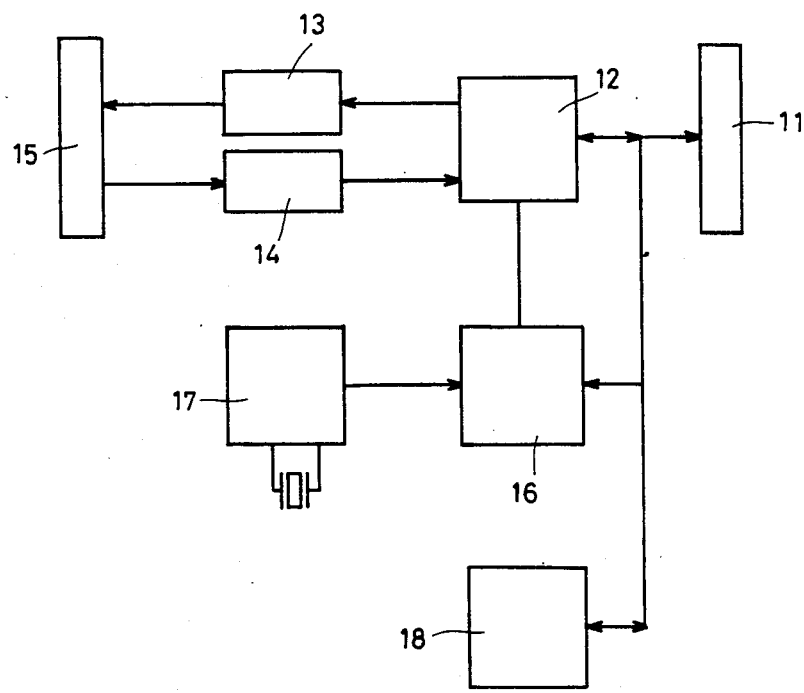
FIG. 3 is a simplified block diagram of the interface 2 available for the data transmission.
Figure 4:
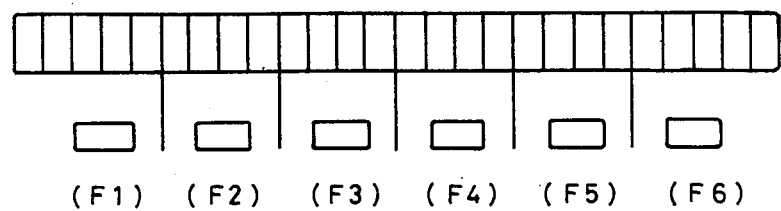
FIG. 4 is a table representing the relationship between the displays and the software keys (F1 through F6) of the pocket computer 1.

FIGS. 2 and 3 respectively denote simplified block diagrams of said pocket computer 1 and data transmission interface 2. In FIG. 2, symbol 3 denotes the central processing unit (CPU), 4 denotes a ROM that stores either the basic interpreter or monitor of the pocket computer 1, and symbol 5 denotes a RAM that can be used as the data buffer when being used for the basic programming or serving either as a system area or data terminal. Symbol 6 denotes I/O ports used for reading key signals. Symbol 7 denotes keys using matrices for feeding back the input key signals to strobe signals output from I/O ports 6. Symbol 8 denotes the display buffer memory, which causes any desired display pattern to be displayed in the LCD display position by writing said pattern in said memory. Symbol 9 denotes 5×7 dots LCD display positions containing 26 digital positions ×1 row. Symbol 10 denotes a connector connected to external interface units. In FIG. 3, symbol 11 denotes a connector connected to the pocket computer 1. Symbol 12 denotes an LSI UART (a generic name of the serial/parallel converter circuit) used for the data communication, which converts the transmitting data into serial data before transmission and converts the serial data into parallel data when receiving data. Symbols 13 and 14 respectively denote level converter circuits. Symbol 15 denotes an external unit, for example, a connector for connecting to modem (modulator and demodulator). Symbol 16 denotes the frequency divider that determines the data transmission speed, symbol 17 is the original oscillator that determines the data transmission speed, and symbol 18 denotes the control ROM that causes the pocket computer to function as a data terminal, while all the mode setting formats related to the present invention are written into this unit. FIG. 4 shows the relationship between the displays and soft keys (F1 through F6). Each soft key defines any sequence desired for the key by the operator. As shown in the drawing, six of the soft keys (F1 through F6) are horizontally provided below the display 9. As a preferred embodiment of the present invention, the method of mode setting can be grouped into 4 typical formats shown in FIG. 5. Format (1) will be activated when the terminal state is entered from the basic state. Format (1) represents a mode in which a pocket computer either starts to execute the terminal operation or returns to the basic mode. If Ent (F4) key is pressed, the pocket computer will be operated as a data terminal. If Aut (F5) is pressed, said computer will output the defined auto sine code before it starts to operate as a data terminal. If Quit (6) key is pressed, the pocket computer will return to the basic state. Format (2) will be activated when either the auto sine code or key sequence of soft keys and/or communication parameter is entered. If AUT (F4) key is pressed, the definition mode of the auto sine code will be entered. If Fnc (F5) key is pressed, the key sequence definition mode will be entered covering all the soft keys F1 through F6, which then outputs the key sequence which is defined when the terminal operation is executed. If Com (F6) key is entered, the definition mode for the data communication parameter (covering the data transfer speed, character length, parity, and the stop bit length) is entered. Format (3) will activate modes that determine the operation characteristics for when the terminal operation is executed. If Nrm (F4) key is pressed, a normal mode will be entered so that a variety of the received data can be sequentially stored in the character buffer. If A/P (F5) key is pressed, a special mode will be entered so that the data receiving operation will be stopped as soon as the received data reaches 512 bytes.

If A/L (F6) key is entered, a different special mode is entered so that the data receiving operation will be stopped as soon as the code for transferring to the next row is received. Format (4) denotes a mode that outputs a special code whether the contents entered by any pressed key should be displayed or not (Echo) simultaneous with the delivery of said contents, and it determines whether any other special code should be output or not (XO/O) as soon as the ready to recive mode is entered.

When the format 1, 2, 3, and 4, are entered and such formats are displayed, they can be varied by the down-arrowed key , while they can be varied in the direction opposite from the above order by operating the up-arrowed key . FIG. 6 shows some typical examples that describe further details. Example (a) denotes such a display when the terminal state is entered using either Ent or Aut, in which the display is cleared, only leaving a cursor. Example (b) denotes a display when the basic state is restored via Quit. Example (c) denotes a display when Aut is designated by (2). If the auto sine code should remain unchanged, either N ENTER or only ENTER will be input, causing the display to return to (2). Example (d) denotes a case when changing the auto sine code, while any desired contents are being displayed after Y ENTER is executed. If ENTER is input, the input contents will be defined so that the display can be back to (2).

Example (e) denotes a display when Fnc is input. First, the soft key F1 activates a definition mode, however, since the key F1 has already defined "SOFT", the contents of the defined mode are displayed. If the contents were not defined, either N ENTER or ENTER will be activated, and at the same time, display will show the definition mode of the ensuing soft key F2. Example (f) shows a display when any desired contents "HARD" are input for a new definition after Y ENTER is executed. Finally, the input contents will be defined by inputting ENTER, thus allowing the soft key (F2) to activate the ensuing mode.

Example (g) shows that the soft key F2 definition is entered from the preceding soft key F1 definition. No definition is applied to F2 yet. After completing the soft key F6 definition, the format will return to (2). Example (h) shows that Com is input during the mode (2). First, the transfer speed setting mode is activated, which is then displayed being accompanied by the actual transfer speed being present. If no change is needed, the ensuing character length mode will be entered by using either Y ENTER or ENTER input.

Example (i) shows a display when 110 is input after N ENTER is activated so that the transfer speed will be changed from 300 baud to 100 baud.

Example (j) shows a display when the character length setting mode is entered, indicating that 8 bit/data is present. If no change is needed, the ensuing parity setting mode will be entered by using either Y ENTER or ENTER input.

Example (k) shows a display when 7 is input after N ENTER is activated so that the character length 8 will be changed to 7. If ENTER is activated, character length will be set to 7, thus allowing the parity mode to be entered.

Example (l) shows a display when the parity mode is entered. It indicates that no parity exists. If no change is needed, the ensuing stop bit length setting mode will be entered by activating either Y ENTER or ENTER.

Example (m) shows a display when E is input after activating N ENTER so that no parity mode will be changed to an even number parity mode, which is then set by activating ENTER before proceeding to the ensuing stop bit length setting mode. Example (n) shows a display when the stop bit length setting mode is entered, indicating that the stop bit length is 2. If no change is needed, the mode will return to (2) by activating either Y ENTER or ENTER.

Example (o) shows a display when a value 1 is input after N ENTER is activated for changing the stop bit length 2 to 1. By activating ENTER, the stop bit length becomes 1 before the format will return to (2).

Note that symbols "RUN", "PRO", and "RESERVE" respectively show the existing mode of a pocket computer, however, the terminal mode uses these symbols in responding to Nrm, A/P and A/L. Examples (p), (q) and (r) respectively show displays when Nrm (F4), A/P (F5), and A/L (F6) are input during format (3), in which status corresponding to each symbol are provided.

Example (s) shows a case in which, if XO/O (F4) is input while format (4) is entered, a display will be performed in a mode when a special code (XON) is output as soon as a condition is entered to allow the other special code (XOFF) to go out when the terminal is too busy to receive any data, and then it allows said special code (XON) to go out when the terminal has restored the data-receivable condition. Such a mode effectively functions when the XOFF code is received by a host terminal without being allowed to go out until the XON code is received. To allow such a condition to remain, either Y ENTER or ENTER will be activated, and if the terminal should enter a mode without allowing any special code to be output irrelevant of the terminal condition whether it can receive any data or not, N ENTER will be activated, thus causing the display to return to format (4). Example (t) reverses the case shown in Example (s).

Example (u) shows a case in which, if Echo (F5) is input while format (4) is entered, a display will be performed when the terminal operation is executed with the key being input to allow a code to go to the host terminal simultaneous with entry of the display mode.

Such a mode effectively functions when the host terminal does not feed back any code fed from terminals. If no change is needed for the existing status, either Y ENTER or ENTER will be activated so that format (4) is entered. After the input key code is fed to the host terminal, if said host terminal returns the code, N ENTER will be activated so that Echo (F5) will be cancelled, causing the display to eventually return to format (4). Example (v) reverses the case shown in Example (u).

If mode (2) is incorrectly set, for example, if the transfer speed is incorrectly set, or the soft key contents are saturated so that no more contents can be defined, then Example (w) will be displayed, and finally, format (2) will be restored about one second later.

Figure 7:
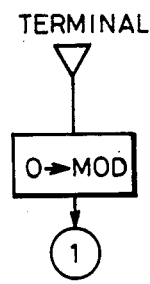
Figure 8:
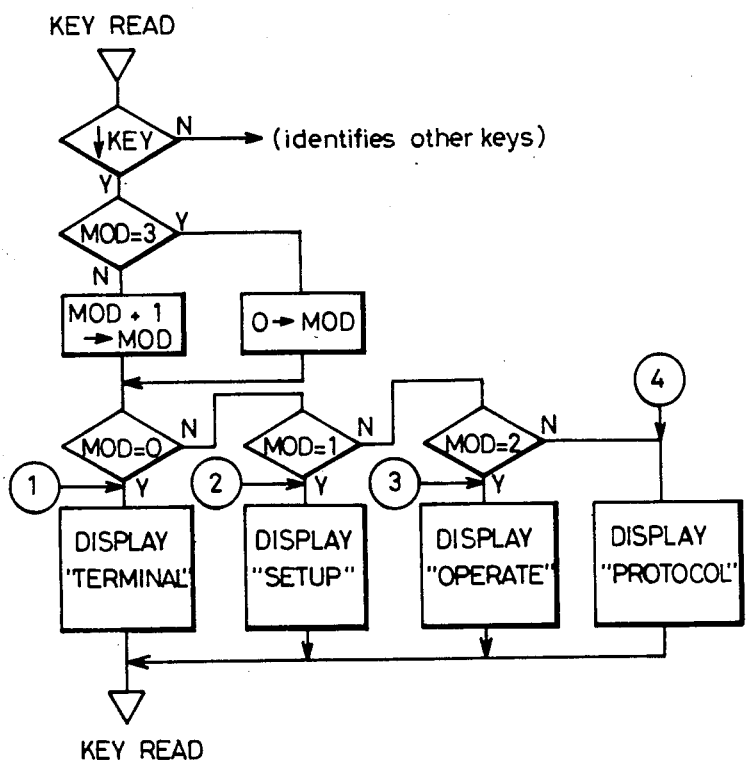

FIGS. 7 through 12 respectively show flowcharts summarizing procedures for executing operations described above. As shown in FIG. 7, if a command called TERMINAL is input during the basic mode, the terminal mode shown in FIG. 5(l) will be displayed. If the down-arrowed key is pressed, MOD will be counted by the quadruple notations as shown in FIG. 8. MOD is the counter that sets 1 through 4 formats as shown in FIG. 5, while any desired format can be selected from these four formats if the down-arrowed key is pressed a specific number of times.

Figure 9:
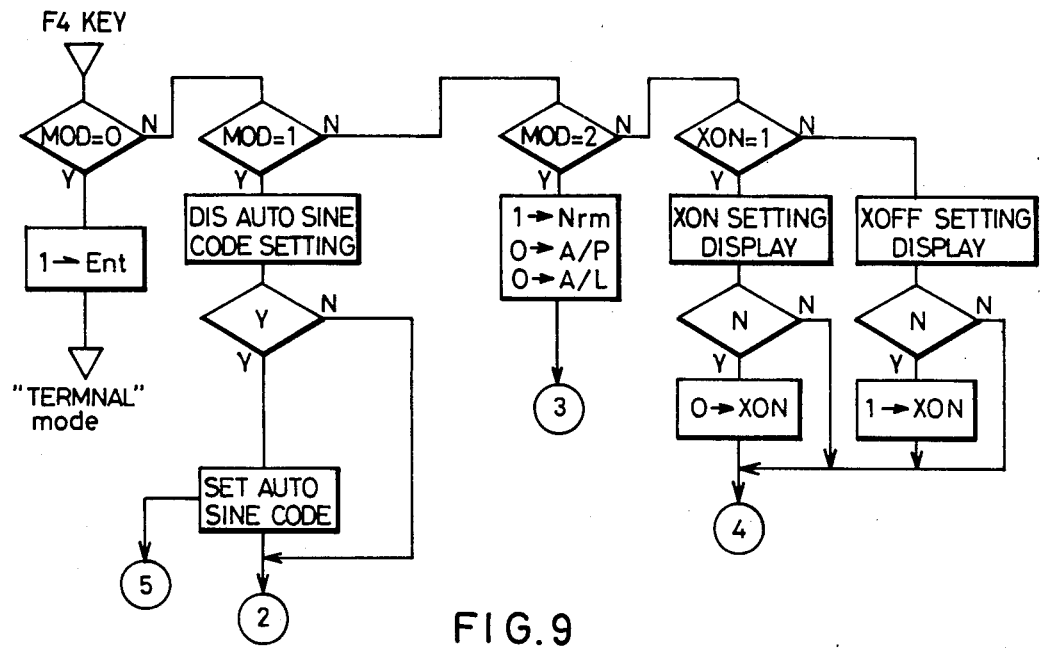

If F4 key is pressed, operations will be executed as shown in FIG. 9. In other words, while the counter MOD remains zero (0), flag Ent will be set so that the pocket computer will operate as the data terminal, and so that the terminal function can be executed.

Figures 5, 6A:
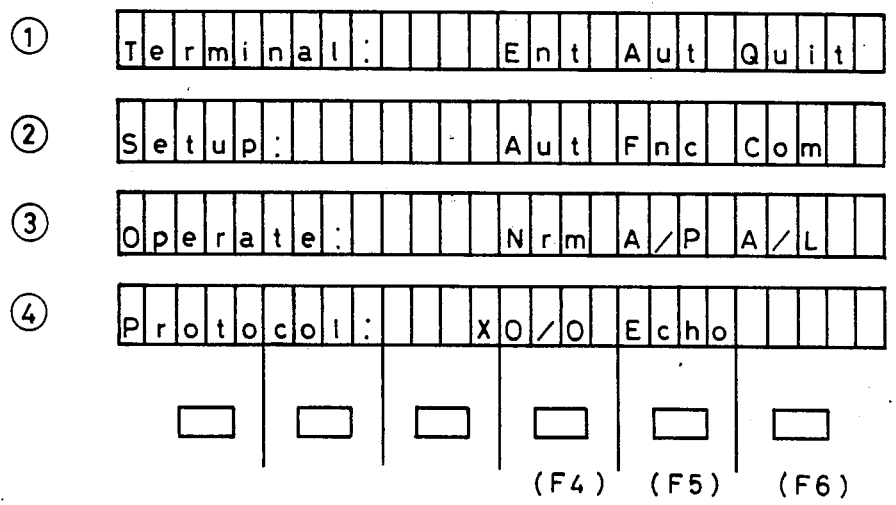
FIG. 5 shows a typical example of the display when modes have been set as a preferred embodiment of the present invention.
Figure 12:
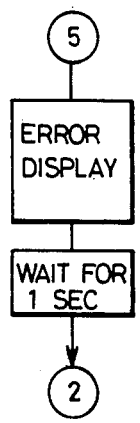

If MOD=1, as shown in FIG. 6(c), a disllay will be performed, inquiring if the auto sine code should be changed, or not. If Y key is pressed, the ensuing auto sine code will be set. If any error occurs, error: will be displayed as shown in FIG. 12, and the display will be back to mode (2) shown in FIG. 5 about 1 second later. If MOD=2, normal mode flag Nrm will be set, resetting all other mode flags. If MOD=3, operation will be performed in responding to either ON or OFF mode of special codes XON/XOFF described above. Flag XON indicates that ON mode exists. If flag XON is 1, a display will be performed as shown in FIG. 6 (s). If N key is pressed, flag XON will be reset, and so the display will be changed to that is ,shown in FIG. 6 (t). If flag XON is 0, a display will be performed as shown in FIG. 6 (t).

Figure 10:
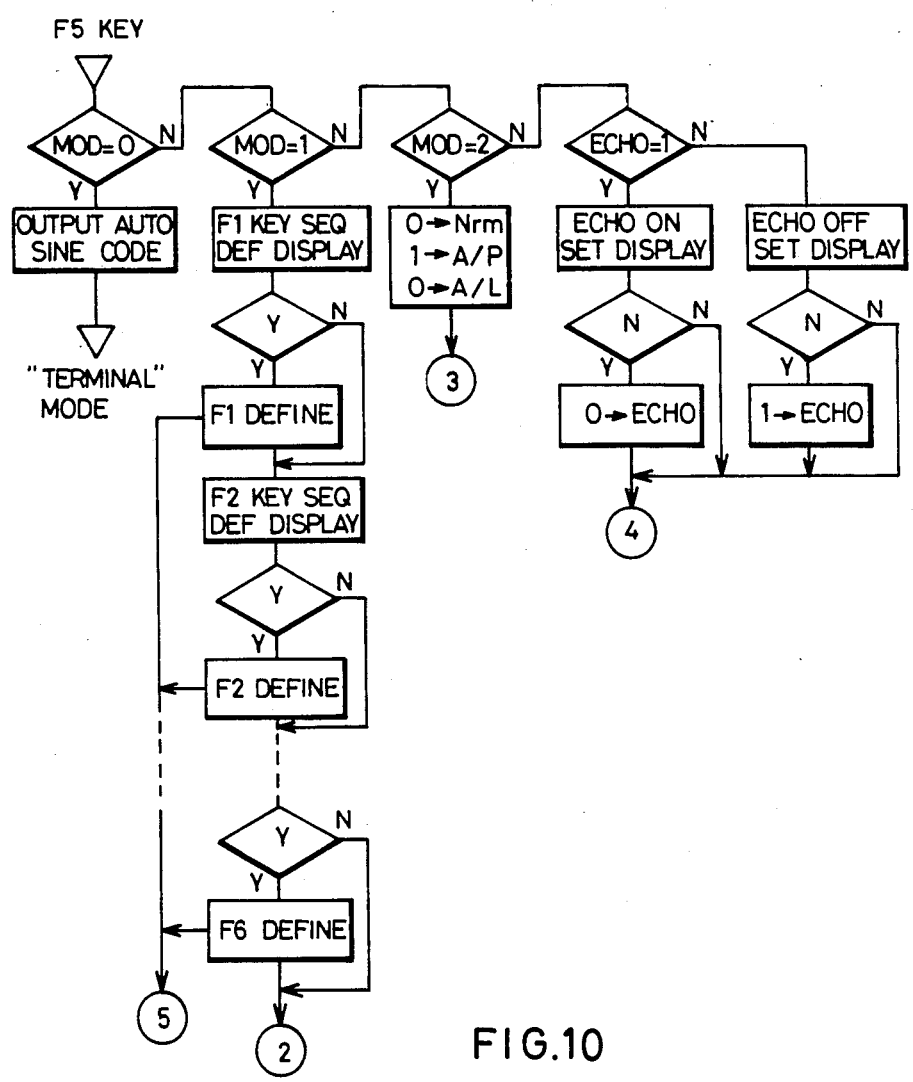
Figure 11:
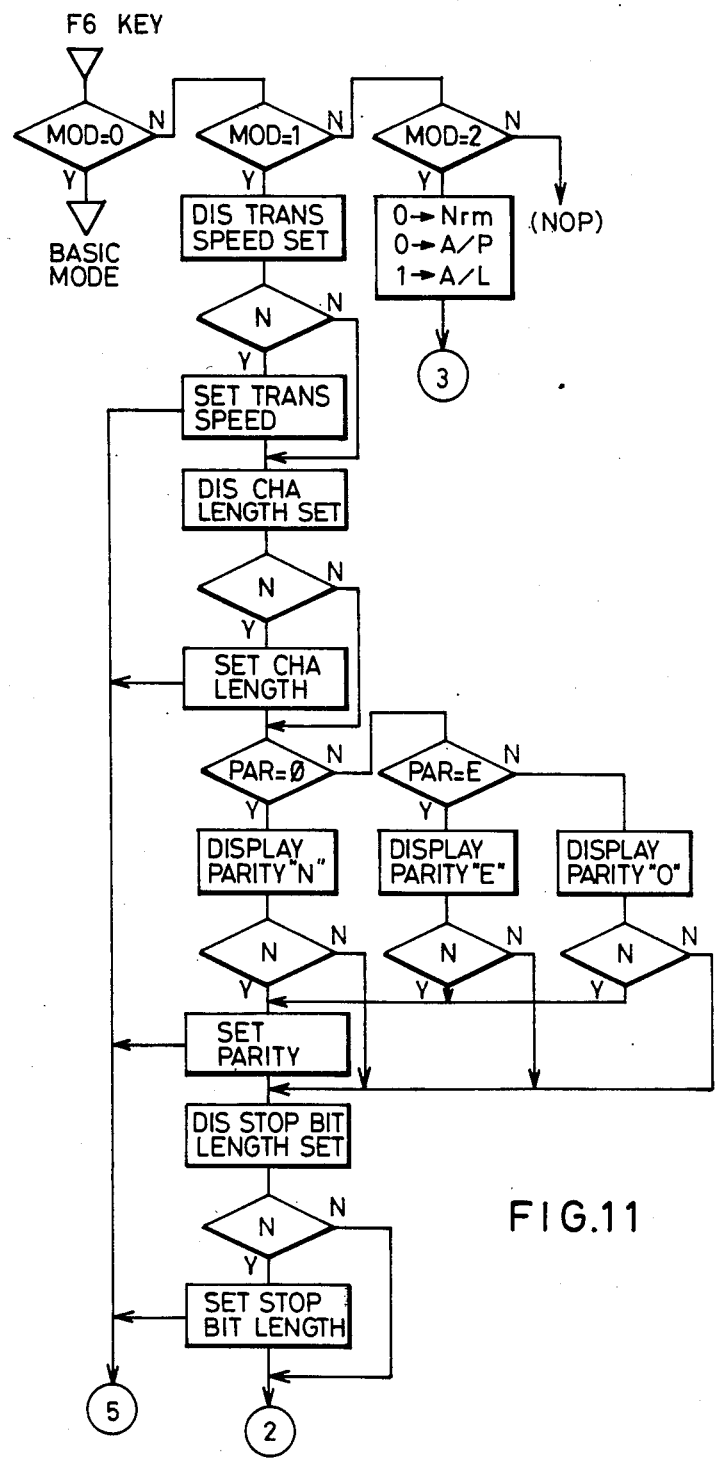

The following describes the sequential operations to be performed when F5 key is pressed. If MOD=0, as shown in FIG. 10, terminal operations will be entered after the auto sine code is output. If MOD=1, as shown in FIG. 6 (f), definition of the F1 key sequence will be displayed. If Y key is pressed, the ensuing key sequence will be defined. In the same manner, key sequences will be defined continuously until the F6 key sequence definition is completed. If MOD=2, flag A/P showing the preceding A/P mode will be set, thus resetting all other mode flags. If MOD=3, operations will be performed in responding to the status of flag ECHO showing the Echo mode. If ECHO=1, display will be performed as shown in FIG. 6 (u). If N key is pressed, ECHO will be reset, and then a display will be performed as shown in FIG. 6 (v). If ECHO=0, a display will be made as shown in FIG. 6 (v).

Next, operations in responding to F6 key are described below. If MOD=0, the basic mode will be restored. If MOD=1, as shown in FIG. 6 (h), transfer speed will be displayed, and if N key is pressed, the ensuing value being input will be set as the transfer speed. Next, as shown in FIG. 6 (j), character length will be displayed, and if N key is pressed, the ensuing value being input will be set as the character length. Next, operations will be performed in responding to the contents of register PAR which shows the parity mode being entered. If PAR=0, a display will be performed as shown in FIG. 6 (l). If PAR=E, an even number parity mode will be entered. If PAR=0, an odd number parity mode will be entered. If N key is pressed, a parity mode corresponding to the ensuing code being input will be set. Next, as shown in FIG. 6 (n), stop bit length will be displayed. If N key is pressed, the ensuing value being input will be set as the stop bit length. If MOD=2, flag A/L that indicates said A/L mode will be set, thus resetting all other mode flags. If MOD=3, all operation will be cancelled.

The present invention thus described in reference to the annexed drawings will obviously be suggestive of any derivation or modification from the spirit and scope described above by those skilled in the arts. It should be understood, however, that the present invention is not limitative of the spirit and scope described above, but is intended to include all of derivations/modifications within the spirit and scope of the following claims.

What is claimed is:

1. A data termainal interface device that can be used in a external connection with a portable computer that has a display with a small capacity for displaying characters in only a single horizontal line and a keyboard, the portable computer being usable as a data terminal, comprising:

means for causing the display of said computer to display data terminal control prompts so as to guide the operator in the use of the computer, whereby each prompt is arranged along said single horizontal line so that it is vertically aligned with a specific one of a plurality of function keys of the computer keyboard, said keys being disposed on a line parallel to the single horizontal line of the display and displaying said prompts on the display in accordance with a plurality of general formats whereby each format contains a plurlaity of specific mode setting capabilities of the computer;

means for stepping the display from one of said general formats to another of said general formats without activating one of the keys that correspond to the display prompts; and means for stepping the display through the available specific modes within any selected one of said general formats by actuating a key which is vertically aligned with a prompt associated with the specific modes.

* * * * *